April 29, 1958 G. J. WATERBURY Re. 24,465

TOGGLE ACTUATED, PLIER-TYPE WRENCH

Original Filed Nov. 22, 1946

GLENN J. WATERBURY
INVENTOR.

BY George T. Smyth.
ATTORNEY

United States Patent Office

Re. 24,465
Reissued Apr. 29, 1958

24,465

TOGGLE ACTUATED, PLIER-TYPE WRENCH

Glenn J. Waterbury, Van Nuys, Calif., assignor to Parker Manufacturing Company, Worcester, Mass., a corporation of Massachusetts Original No. 2,574,676, dated November 13, 1951, Serial No. 711,611, November 22, 1946. Application for reissue October 21, 1957, Serial No. 692,516

1 Claim. (Cl. 81—369)

Matter enclosed in heavy brackets [ ] appears in the original patent but forms no part of this reissue specification; matter printed in italics indicates the additions made by reissue.

This invention relates to pliers and more particularly to pliers having a toggle mechanism formed in a part by one lever of the pliers for operating the movable jaw of the same.

This type of pliers are so constructed that when the jaws are placed about an article to be gripped by the pliers and the levers thereof brought together until the pivotal connection between the links forming the toggle are brought beyond a line joining the opposite ends of the links, a contractile *tension* spring acts *to oppose movement of said pivotal connection back across said line, thereby* to hold the jaws in gripping relation with the article.

Pliers of this type have been in use for a considerable period and are widely used in many industries. They are however subject to one criticism, that being the difficulty in opening the jaws once they have been clamped about an article. In the toggle pliers heretofore proposed it has been necessary to use both hands to open the jaws which is sometimes awkward or difficult to do because of the nature of the work being undertaken. Thus in instances where the person using the pliers required one hand free to hold or manipulate the article being gripped or other tools performing a work operation on the article, the pliers were extremely difficult if not impossible to open.

The primary object of the present invention is to obviate the difficulty had with previously proposed pliers of this type by providing a pliers having means for opening the jaws of the same which can be actuated by one hand of the user. This means in the now preferred embodiment of the present invention comprises an arm pivotally connected adjacent one end thereof to the one link of the toggle mechanism and so formed at that end that movement of the arm in one direction applies a magnified breaking force to one link of the toggle mechanism.

The portion of the arm adjacent the pivotal connection between the latter and the one link of the toggle mechanism is preferably formed with a face which actually forms an eccentric cam for forcing the toggle mechanism into a jaw-opening position. In the embodiment of the invention illustrated the cam acts against the lever of the pliers forming a link of the toggle mechanism, when the arm is swung about its pivotal connection to the other link of the toggle mechanism, to move the toggle mechanism into a position in which the spring will open the jaws of the pliers.

The arm is carried intermediate the two levers of the pliers and does not complicate or render awkward the normal use of the pliers. The arm is quite easy to use for it may be moved toward the lever of the plier not forming a part of the toggle mechanism to break the latter and open the pliers merely by squeezing the arm and this lever in the one hand.

It will thus be seen that the primary feature and advantage of the pliers of the present invention consists in the ability of the same to be opened by the one hand of a user while retaining all of the desired characteristics of this type of pliers.

Other features and advantages of the pliers of the present invention will be apparent from the following detailed description taken in connection with the accompanying drawing in which.

Figure 1:
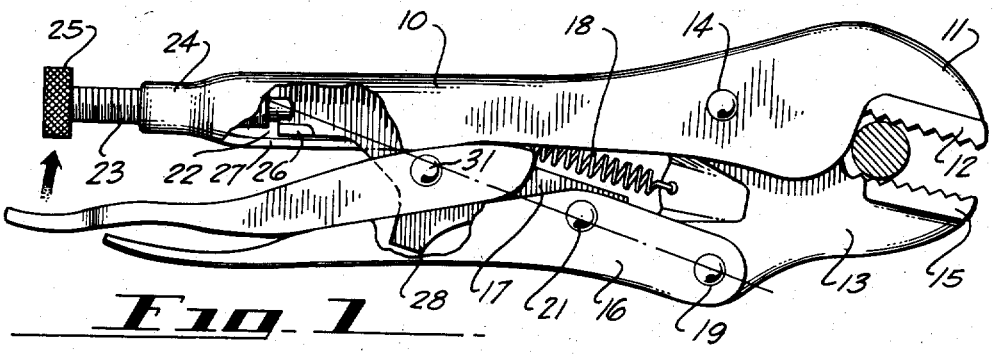
Figure 1 is an elevational view of pliers embodying the present invention partly in section to more clearly illustrate the same and showing the pliers with the jaws thereof locked about an article.
Figure 2:
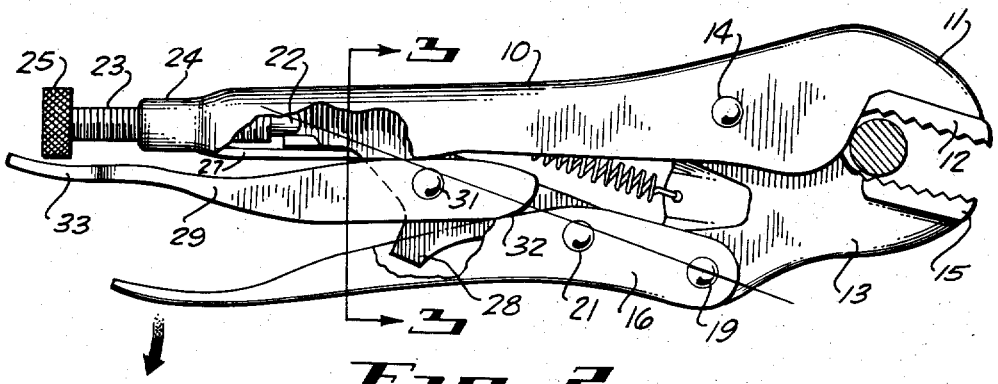
Figure 2 is a view somewhat like Figure 1 but showing the pliers after the arm has been moved to open the jaws.
Figure 3:
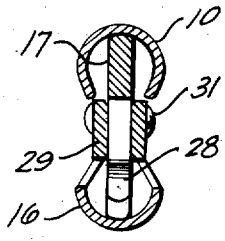
Figure 3 is a sectional view taken along line 3—3 of Figure 2.
Figure 4:
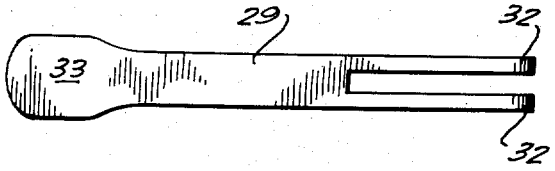
Figure 4 is a plan view of the arm.

The pliers of the present invention, referring now to the drawing, comprises a lever 10 forming a handle for a jaw 11 which due to the normal action of the pliers will be hereinafter referred to as the fixed jaw. The lever 10 may be formed of some suitable metal in any manner desired but as clearly shown in Figure 3 is channel-shaped throughout its intermediate portion as well as at the end carrying the jaw 11.

The jaw 11 is faced with a hard metal plate 12 provided with teeth or serrations along the work engaging face thereof. The plate forming the work engaging element of the jaw is welded or otherwise securely and permanently fixed to the jaw 11.

The movable jaw 13 of the pliers comprises a casting, drop forging or some similarly formed member. This jaw is pivotally anchored to and between the flanges of the lever 10 by a suitable pivot pin 14. At the free end of the jaw 13, a work-engaging plate 15 having a serrated face is mounted for cooperation with the serrated plate 12 of the fixed jaw 11. The plate 15, like the plate 12 is formed of some hardened steel suitable for the intended purpose of the plates.

The movable jaw 13 is actuated by means of an operating mechanism comprising an articulated member consisting of a lever 16 pivotally connected at the one end thereof to an ear formed integral with the jaw 13 and at its opposite end to one end of a link 17 pivotally connected at its opposite end to the lever 10, and a coil tension spring 18. The spring is anchored at one end to the lever 10 and at its opposite end to the jaw 13 at a point spaced from the pin 14 and normally tends to urge the jaw 13 away from the fixed jaw 11.

The lever 16 is formed with an extension 16a which serves as a handle member to be used in conjunction with the handle formed by the lever 10. The one end of the lever 16 is pivotally connected to the rear portion of the jaw 13 by a pin 19 spaced from the pin 14. As the link 17 is pivotally connected to the lever 16 intermediate the ends thereof by a pin 21 the link and the lever 16 form a toggle mechanism operated by the free or handle end of the lever 16.

The free end of the link 17 is formed with a smooth walled socket for receiving the substantially spherical end of a boss 22 carried by the end face of a threaded stud 23. The free end of the lever 10 is formed as an internally threaded sleeve 24 for receiving the stud for axial movement upon rotation of the latter. It will now be seen that the fulcrum of the link 17 on lever 10 can be adjusted longitudinally of the latter by merely rotating the knurled head 25 of the threaded stud 23 to thereby adjustably shift the location of the base of reaction of the link 17. Furthermore, it should be also apparent that adjustment of the fulcrum of the link 17 on the lever 10 by means of the stud 23 will act to adjust the angular position of the movable jaw 13 relative to the fixed jaw 11 and thus permit accommodation of work pieces of different thickness.

To hold the end of the link 17 between the flanges of the lever 10, the link 17 is formed with oppositely directed ears or lugs 26 for engagement with retaining members formed by laterally deforming the edges of the flanges of the lever 10. The members 27 define a slot of a width slightly greater than the thickness of the link 17 so that the link can move freely during use of the pliers.

[Although the] *The* spring 18 will normally rock the jaw 13 clockwise about the pin 14 and thus hold the jaws separated, due to the location of the pivotal connection between the lever 16 and the link 17 relative to the pivotal connection between the lever 16 and the movable jaw 13 [when]. *When* the lever 16 is swung toward the lever 10, the pin 21 will move beyond a line passing through the pin 19 and the fulcrum point of the link 17 on the lever 10 [and the spring will then serve to move the jaw 13 in a counterclockwise direction into good gripping relationship with the fixed jaw].

To limit movement of the jaw 13 toward the jaw 11 just after the pin 21 has moved beyond the line passing through the pin 19 and the fulcrum point of the link 17 on the lever 10, that is after the toggle mechanism has just passed its dead center position, the link 17 is formed with a stop 28 in the form of a lug which engages the inner face of the lever 16 and prevents further movement of the link.

The spring *18* now acts to [hold the jaws in good gripping engagement with the work piece and resists] *resist* movement of the lever 16 away from the lever 10. Although this resistance tends to prevent the jaws from being accidentally separated it complicates the opening of the pliers in that it is necessary to grasp the one lever in one hand while the second lever is grasped by the other hand after which the levers can be pulled apart until the toggle mechanism moves past its dead center position. It will be seen that actually the same force must be expended in opening the jaws as is expended in closing the jaws. Although this feature is desirable as it prevents accidental dislodgment of the pliers from an article gripped by the jaws it does render the opening of the pliers difficult and the opening operation requires both hands of the user.

To facilitate opening the jaws, the present invention provides means for applying a force to the toggle mechanism to move the same past the dead center position to open the jaws through the use of but one hand of the user. Thus with the pliers engaging a work piece the same can be released by operation of the means by the one hand of the user so that the other hand of the user may be entirely free for manipulation of the work piece or other tools engaging or performing operations on the work piece.

Although this means may take different forms, in the now preferred embodiment of the invention the means comprises a bifurcated arm 29 pivotally connected adjacent the one end thereof by a pin 31 to the link 17 so as to lie intermediate the levers 10 and 16. The tines of the arm adjacent the pivotal connection effected by the pin 31 are formed with cam faces 32 which, when the outer end of the arm 29 is moved toward the handle or lever 10, apply an outwardly directed force against the handle or lever 16 adjacent the pin 21. The movement given to the lever 16 is sufficient to move the same to a position relative to the link 17 in which the axis of the connection effected by the pin 21 is disposed outwardly of the line joining the pin 19 and the fulcrum of the link 17 on lever 10. As has been explained, this movement of the links forming the toggle mechanism causes the spring 18 to move the jaw 13 in a clockwise direction and the jaws are moved apart. As the lever formed by the portion of the arm 29 between the free end thereof and the pin 31 will in effect magnify any force applied to the free end of the arm 29, the force necessary to move the pin 21 past dead center of the toggle mechanism to open the pliers can be had by the application of a much smaller force to the free end of the arm 29. This in itself simplifies opening of the pliers of the present invention as a much smaller force is required to open the jaws than is required to close the jaws.

To further facilitate opening of the pliers the free end of the arm 29 is provided with an enlarged terminal portion 33 which forms an easily manipulated finger hold. Thus to open the pliers a user may grasp the lever or handle 10 in the one hand and by the use of but one finer of that hand grasping the hold 33 pull the arm 29 toward the handle 10 and open the pliers.

Although the now preferred embodiment of the present invention has been shown and described herein it is to be understood that the invention is not to be limited thereto for it is susceptible to changes in form and detail within the scope of the appended claim. For instance, the arm 29 need not be mounted to the link 17 for actually the arm could be mounted to the handle 10 and operate to open the toggle in the same manner as does the arm in the illustrated embodiment of the invention.

I claim:

A tool of the type described, comprising: a handle having a fixed jaw integral therewith; a movable jaw pivotally attached to the handle to move relative to the fixed jaw and having an ear spaced from the pivotal attachment between the jaw and said handle; toggle means, including two pivotally interconnected, elongate *toggle* members, the free end of one *toggle* member being pivotally connected to said ear, the free end of the other *toggle* member being pivotally connected to said handle; a tension spring having one end fixed to said ear and having the other end fixed to said handle, whereby said movable jaw normally tends to move away from said fixed jaw; an extension carried by the toggle member pivotally connected to said ear forming a handle substantially coextensive with said first-named handle, and cooperative therewith to move said toggle means, as a user squeezes said handles together, to [a position in which said tension spring will] urge the movable jaw toward said fixed jaw; an arm; a pair of tines outwardly extending from one end of said arm; and means for pivotally connecting said tines in a straddling relationship to the toggle member connected to said first-named handle, whereby said arm is disposed intermediate said handles for swinging movement between the same, the free ends of said tines being formed with curved faces movable into engagement with the handle-forming extension of the other toggle member and adapted to apply a force against said extension as the opposite end of the arm is moved toward said first-named handle, to urge said toggle means to a position in which the tension spring will urge the movable jaw away from said fixed jaw.

References Cited in the file of this patent or the original patent

UNITED STATES PATENTS

| | | |
|---|---|---|
| 952,079 | McIntire | Mar. 15, 1910 |
| 1,489,458 | Petersen | Apr. 8, 1924 |
| 2,201,918 | Petersen | May 21, 1940 |
| 2,443,153 | Wells | June 8, 1948 |
| 2,462,709 | Ball | Feb. 22, 1949 |
| 2,500,261 | Parker | Mar. 14, 1950 |
| 2,514,130 | Jones | July 4, 1950 |
| 2,523,385 | Mead | Sept. 26, 1950 |
| 2,574,676 | Waterbury | Nov. 13, 1951 |
| 2,576,286 | Eisenberg | Nov. 27, 1951 |
| 2,604,803 | McCann | July 29, 1952 |